(12) United States Patent
Gopireddy et al.

(10) Patent No.: US 10,915,268 B2
(45) Date of Patent: Feb. 9, 2021

(54) EVENT BASED RUNTIME SCHEDULING

(71) Applicant: International Business Machines Corporation, Armonk, NY (US)

(72) Inventors: Lakshmi S. Gopireddy, Ongole (IN); Sreepurna Jasti, Hyderabad (IN); Gireesh Punathil, Kerala state (IN); Bidisha Pyne, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 110 days.

(21) Appl. No.: 15/853,054

(22) Filed: Dec. 22, 2017

(65) Prior Publication Data

US 2019/0196871 A1 Jun. 27, 2019

(51) Int. Cl.
| | |
|---|---|
| G06F 9/46 | (2006.01) |
| G06F 3/06 | (2006.01) |
| G06F 9/48 | (2006.01) |
| G06F 9/54 | (2006.01) |
| G06F 9/50 | (2006.01) |

(52) U.S. Cl.
CPC .......... *G06F 3/0659* (2013.01); *G06F 9/4881* (2013.01); *G06F 9/4887* (2013.01); *G06F 9/5027* (2013.01); *G06F 9/545* (2013.01); *G06F 9/546* (2013.01); *G06F 3/061* (2013.01)

(58) Field of Classification Search
CPC . G06F 9/545; G06F 9/50; G06F 9/544; G06F 9/45533; G06F 9/45558; G06F 9/4881; G06F 9/461; G06F 21/60; G06F 9/4406; G06F 3/0659; G06F 3/061; G06F 9/4887; G06F 9/546
See application file for complete search history.

(56) References Cited

U.S. PATENT DOCUMENTS

| | | | |
|---|---|---|---|
| 5,944,778 A | 8/1999 | Takeuchi et al. | |
| 6,112,221 A | 8/2000 | Bender et al. | |
| 7,065,762 B1 | 6/2006 | Duda et al. | |
| 2003/0074487 A1* | 4/2003 | Akgul | G06F 9/4406 719/328 |
| 2004/0244003 A1* | 12/2004 | Perfetto | G06F 9/4881 718/100 |
| 2009/0113424 A1* | 4/2009 | Chen | G06F 9/45558 718/1 |
| 2010/0083261 A1* | 4/2010 | Jayamohan | G06F 9/461 718/102 |
| 2010/0229173 A1* | 9/2010 | Subrahmanyam | G06F 9/45533 718/103 |

(Continued)

FOREIGN PATENT DOCUMENTS

| | | |
|---|---|---|
| CN | 102662725 B1 | 1/2015 |
| CN | 106656845 A | 5/2017 |

*Primary Examiner* — Tuan A Vu
(74) *Attorney, Agent, or Firm* — Yee & Associates, P.C.

(57) ABSTRACT

A computer-implemented method, apparatus, and computer program product for scheduling a process to run on a processor. A determination is made whether a process running on a processor is making an input/output operation system call. The process is de-scheduled from running on the processor in response to a determination that the process is making an input/output operation system call. The process is allowed to continue running on the processor in response to a determination that the process is not making an input/output system call.

20 Claims, 4 Drawing Sheets

(56) References Cited

U.S. PATENT DOCUMENTS

| | | | |
|---|---|---|---|
| 2012/0167119 A1* | 6/2012 | Liss | G06F 9/544 |
| | | | 719/318 |
| 2013/0290644 A1* | 10/2013 | Soares | G06F 9/545 |
| | | | 711/147 |
| 2014/0137184 A1* | 5/2014 | Russello | G06F 21/60 |
| | | | 726/1 |
| 2015/0121135 A1 | 4/2015 | Pape | |
| 2015/0149666 A1 | 5/2015 | Wang et al. | |
| 2015/0212855 A1* | 7/2015 | Klee | G06F 9/50 |
| | | | 718/104 |

* cited by examiner

EVENT BASED RUNTIME SCHEDULING

BACKGROUND INFORMATION

1. Field

The present disclosure relates to methods and systems for assigning work to processors on a time-shared basis.

2. Background

Scheduling is a method of assigning work from different processes to one or more processors on a time-shared basis so that each process is executed in a pseudo-parallel fashion. The fundamental premise for scheduling is to make sure that the overall system resources are efficiently utilized, whereas the discrete objective of a scheduler may vary based on a specific scheduling policy (for example maximizing throughput, maximizing fairness, minimizing latency etc.) which is optimal for a specific workload.

Different scheduling policies came into existence based on most common program behaviors as well as inferences from historical evidence. An example of this is: I/O bound processes are prioritized over non-I/O bound ones so that they are allowed to run early, and then succumb to an imminent blocking I/O which eventually yields the CPU—upon which the CPU can then be assigned to other tasks.

There exists no single scheduling policy which yields optimal results on all types of workloads. For this reason, operating systems are configured with a default scheduling policy, with options to alter them based on the user's choice.

SUMMARY

Illustrative embodiments provide a computer-implemented method of scheduling a process to run on a processor. A determination is made whether the process running on the processor is making an input/output operation system call. The process is de-scheduled from running on the processor in response to a determination that the process is making an input/output operation system call. The process is allowed to continue running on the processor in response to a determination that the process is not making an input/output system call.

The illustrative embodiments also include an apparatus, comprising a scheduler. The scheduler is configured to determine whether a process running on a processor is making an input/output operation system call, de-schedule the process from running on the processor in response to a determination that the process is making an input/output operation system call, and allow the process to continue running on the processor in response to a determination that the process is not making an input/output system call.

The illustrative embodiments also include a computer program product for scheduling a process to run on a processor. The computer program product comprises a computer readable storage medium having program instructions stored thereon. First program instructions stored on the computer readable storage medium are executable by a device to cause the device to determine whether the process running on the processor is making an input/output operation system call. Second program instructions stored on the computer readable storage medium are executable by the device to cause the device to de-schedule the process from running on the processor in response to a determination that the process is making an input/output operation system call and to allow the process to continue running on the processor in response to a determination that the process is not making an input/output system call.

Other variations are possible, as described below.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
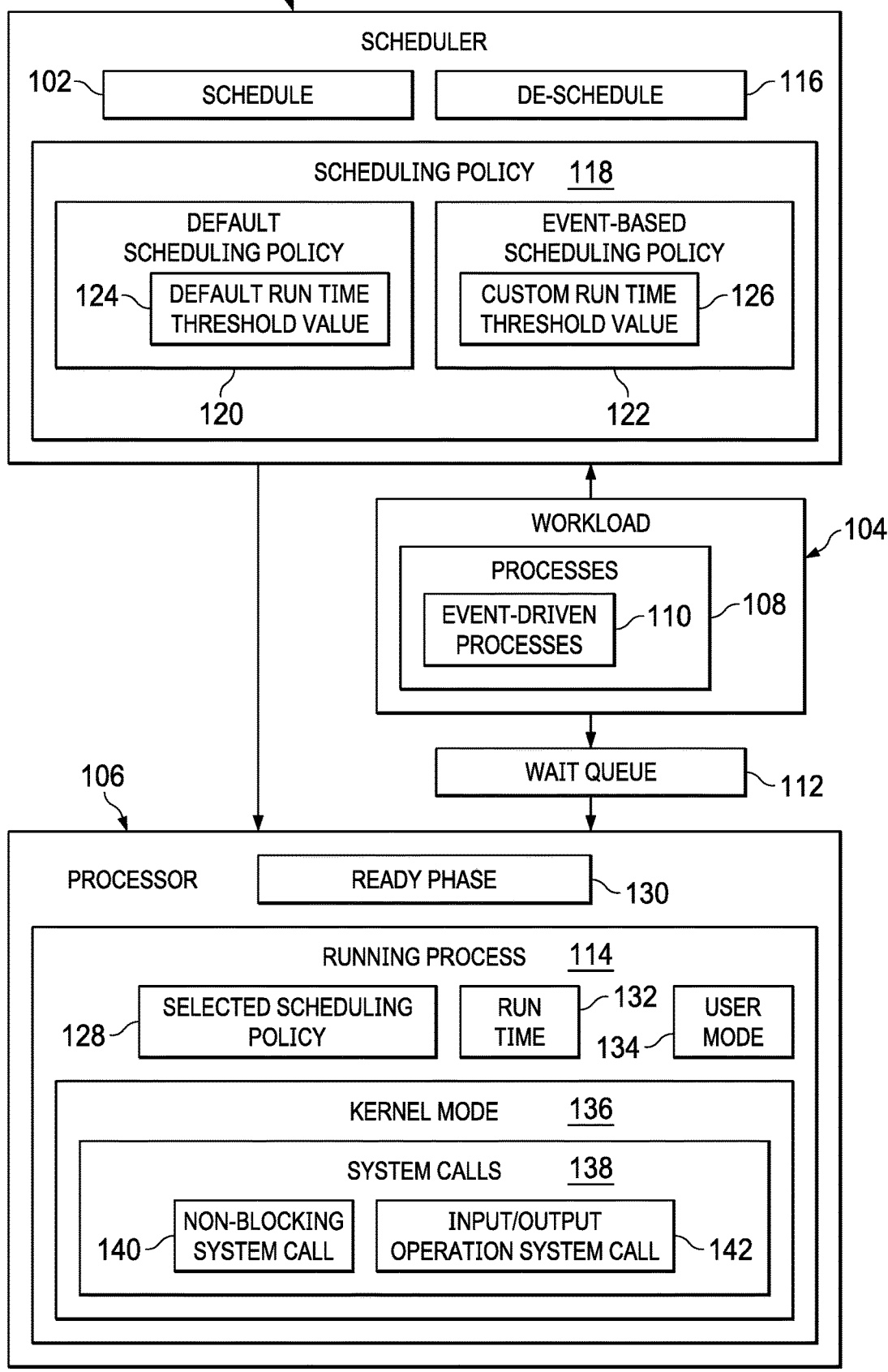
FIG. 1 is a block diagram of a scheduler in accordance with an illustrative embodiment.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account a variety of considerations. For example, the illustrative embodiments recognize and take into account that scheduling policies can be made more efficient if vital insights about the workload characteristics can be known to the scheduler in a static manner, or the scheduler is implemented or configured with the knowledge of expected workload type. Illustrative embodiments propose a method to schedule event-driven asynchronous server programs in an efficient manner, using the insights gleaned from the characteristics of the programs.

Illustrative embodiments use an optimal execution point in an event-driven asynchronous virtual machine at which the scheduling decisions can be made rather than at an arbitrary control flow sequence, and thereby coalesce an I/O wait time with that of a de-scheduled wait to reduce the overhead of untimely context switching. In an asynchronous event-driven architecture, the virtual machine does not block on I/O in-line with the execution, instead requests are pushed to an event notification mechanism in the operating system kernel and the rest of the code continues to run. Thus, virtual machines almost always block on I/O at a single point in the running flow. Illustrative embodiments leverage this insight to make better scheduling decisions that improve the overall responsiveness of the program.

Turning to FIG. 1, a block diagram of a scheduler is depicted in accordance with an illustrative embodiment. Scheduler 100 may be configured to schedule 102 processing of workload 104 by processor 106.

Workload 104 may comprise a variety of processes 108 to be run on processor 106. Some of processes 108 in workload 104 may include event-driven processes 110. Illustrative embodiments may provide for the scheduling of event-driven processes 110 in a more effective manner.

Scheduler 100 may schedule 102 the running of processes 108 on processor 106 by assigning processes 108 to wait queue 112. Wait queue 112 may be a first-in first-out queue in which a process entered at the back end of wait queue 112 is processed on processor 106 when the process reaches the front end of wait queue 112. A process currently running on processor 106 may be referred to as running process 114. Scheduler 100 may de-schedule 116 running process 114 by stopping running process 114 on processor 106 and adding the process to the back end of wait queue 112.

Scheduler 100 may schedule 102 and de-schedule 116 processes 108 based on scheduling policy 118. In accordance with an illustrative embodiment, scheduling policy 118 may be default scheduling policy 120 or event-based scheduling policy 122. Default scheduling policy 120 may use default run time threshold value 124. For example, without limitation, default scheduling policy 120 may de-schedule 116 a process that has been running on processor 106 for a period of time that is longer than default run time threshold value 124. Event-based scheduling policy 122 may use custom run time threshold value 126 in a manner described in more detail below. Custom run time threshold value 126 may be larger than default run time threshold value 124. Event-driven processes 110 of processes 108 may be scheduled more effectively using event-based scheduling policy 122.

Running process 114 may be characterized by selected scheduling policy 128. Selected scheduling policy 128 may be one of scheduling policy 118 that is used by scheduler 100 to schedule 102 and de-schedule 116 running process 114. For example, without limitation, selected scheduling policy 128 may be default scheduling policy 120 or event-based scheduling policy 122.

In accordance with an illustrative embodiment, operation of processor 106 may be defined by a warm-up phase followed by ready phase 130. Ready phase 130 may be a program control point in the operation of processor 106 where processor 106 has completed initialization sequences, such as allocating an object heap, initializing the compiler, initializing and seeding the event infrastructure, such as the event loop, and is ready to execute processes 108, but an entry point routine of a process is not yet invoked. In accordance with an illustrative embodiment, when the operation of processor 106 reaches ready phase 130, an appropriate system call may be invoked to change selected scheduling policy 128 of a process to event-based scheduling policy 122. In particular, event-based scheduling policy 122 preferably may be selected as selected scheduling policy 128 for event-driven processes 110.

Running process 114 may be characterized by run time 132. Run time 132 is the amount of time that running process 114 has been running on processor 106 during a current running of running process 114 on processor 106. In other words, run time 132 is the amount of consecutive time that running process 114 has been running on processor 106 from the most recent time that running process 114 started running on processor 106 to the current time. If selected scheduling policy 128 for running process 114 is default scheduling policy 120, then running process 114 may be de-scheduled 116 when run time 132 is greater than default run time threshold value 124.

If selected scheduling policy 128 for running process 114 is event-based scheduling policy 122, scheduler 100 may determine whether running process 114 is operating in user mode 134 or kernel mode 136. If running process 114 is operating in user mode 134, the process may be running arbitrary user code. In this case, running process 114 may be allowed to continue running on processor 106 unless run time 132 for running process 114 is greater than custom run time threshold value 126, in which case running process 114 may be de-scheduled 116.

If running process 114 is in kernel mode 136, running process 114 is making system calls 138. A determination may be made whether a system call made by running process 114 is non-blocking system call 140 or input/output operation system call 142. In response to a determination that a system call made by running process 114 is non-blocking system call 140, running process 114 may be allowed to continue running if run time 132 for the process is determined to be less than custom run time threshold value 126. Running process 114 may be de-scheduled 116 if run time 132 for running process 114 is determined not to be less than custom run time threshold value 126.

A system call made by running process 114 that is input/output operation system call 142, such as a multi-event notification system call, means that the process wants to wait for an input/output operation, potentially for an arbitrary duration. In this case, running process 114 may be de-scheduled 116. This mechanism makes sure that the input/output wait time is aligned to the de-schedule time, thereby reducing the overall wait time.

Figure 2:
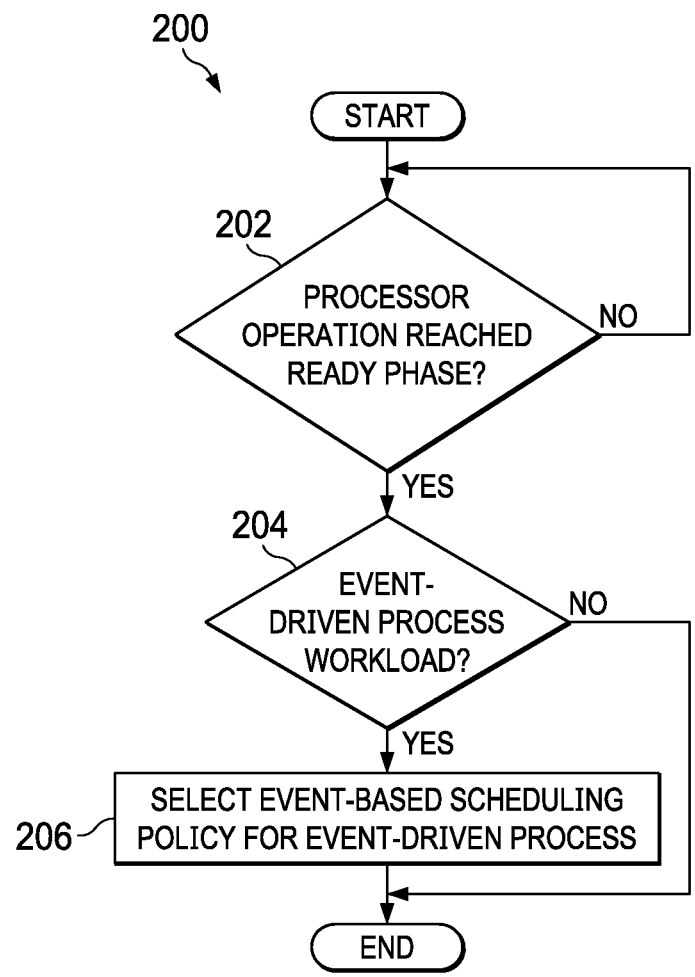
FIG. 2 is an illustration of a flowchart of a process for general scheduling in accordance with an illustrative embodiment.

Turning to FIG. 2, an illustration of a flowchart of a computer-implemented method for initiating use of an event-based scheduling policy for scheduling event-based runtimes for processes performed by a processor is depicted in accordance with an illustrative embodiment. Computer-implemented method 200 may be implemented, for example, to select event-based scheduling policy 122 as selected scheduling policy 128 for use by scheduler 100 to schedule event-driven processes 110 for processing by processor 106 in FIG. 1.

Computer-implemented method 200 may begin by determining whether the operation of the processor has reached a ready phase (step 202). The ready phase may be a program control point in the operation of the processor following a startup of operation of the processor where the processor has completed initialization sequences or processes such as, without limitation, allocating an object heap, initializing a compiler, initializing and seeding an event infrastructure, such as an event loop, performing other initialization sequences or process, or performing various combinations of initialization sequences or processes. When the processor has reached the ready phase the processor is ready to execute an application, but the entry point routine of the application is not yet invoked. Step 202 may be repeated until a determination is made at step 202 that the operation of the processor has reached the ready phase.

In response to a determination at step 202 that the processor has reached the ready phase, a determination may be made whether an event-driven process workload is to be processed (step 204). Having reached the ready phase, the processor is now ready to handle asynchronous event-driven processes, and such workloads may be scheduled for processing more effectively using an event-based scheduling policy in accordance with an illustrative embodiment. In response to a determination that an event-driven process workload is to be processed, the scheduling policy for scheduling the event-driven processes to be performed by the processor may be changed to an event-based scheduling policy in accordance with an illustrative embodiment (step 206), with the process terminating thereafter. For example, without limitation, step 206 may include invoking an appropriate system call to change the scheduling policy of an application thread to an event-based scheduling policy in accordance with an illustrative embodiment.

Figure 3:
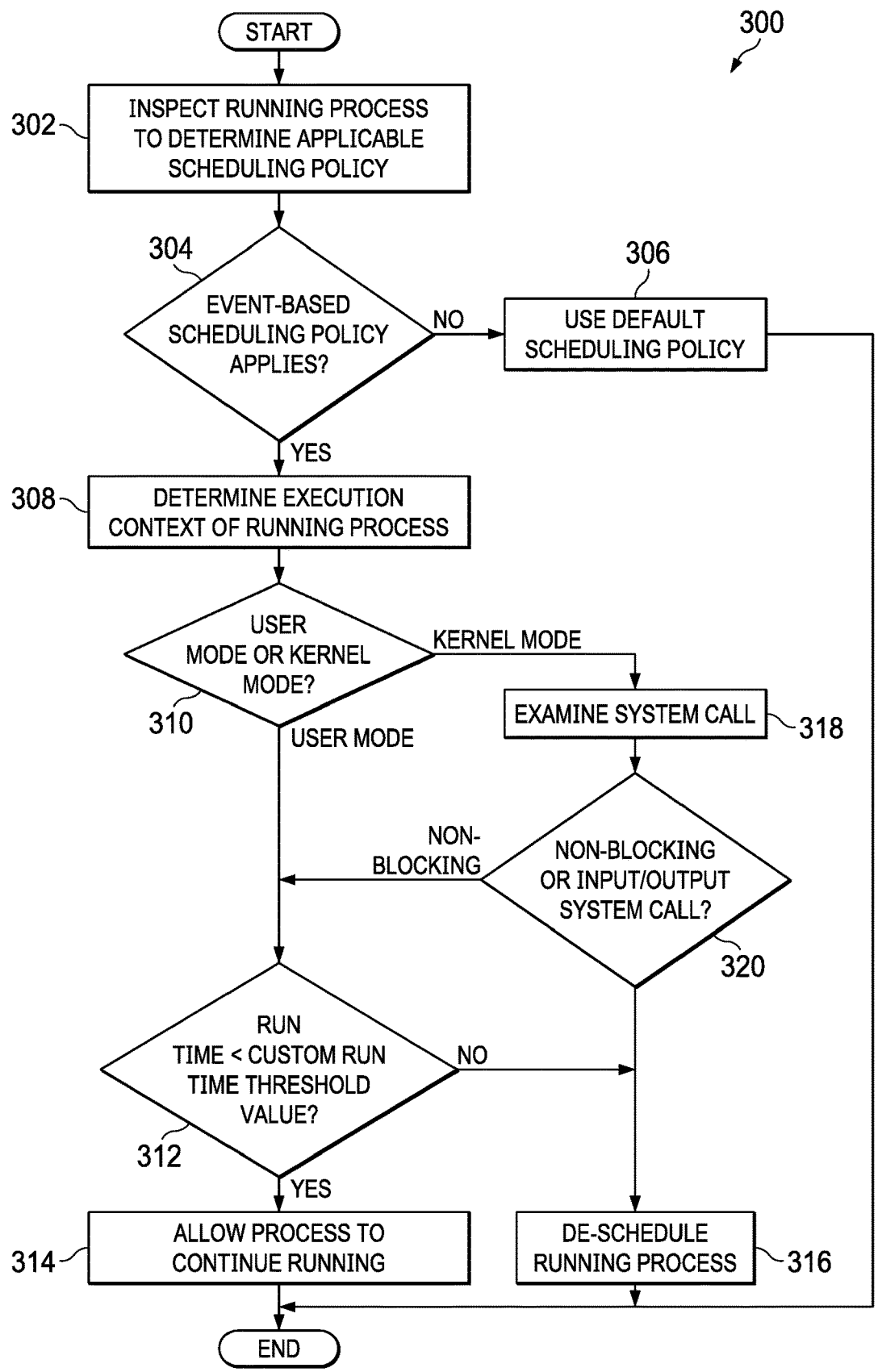
FIG. 3 is an illustration of a flowchart of a process for event driven scheduling in accordance with an illustrative embodiment.

Turning to FIG. 3, an illustration of a flowchart of a computer-implemented method for event driven scheduling is depicted in accordance with an illustrative embodiment. Computer-implemented method 300 may be implemented, for example, in scheduler 100 in FIG. 1. Computer-implemented method 300 may start in response to hardware interrupting a running process, at which point the scheduler may perform method 300.

Computer-implemented method 300 may begin with inspecting the process running on a processor to determine the scheduling policy selected for the running process (step 302). A determination may be made whether the scheduling policy for the running process is an event-based scheduling policy in accordance with an illustrative embodiment (step 304). In response to a determination at step 304 that the scheduling policy for the running process is not an event-based scheduling policy in accordance with an illustrative embodiment, a default scheduling policy may be used for process scheduling (step 306).

In response to a determination at step 304 that the scheduling policy for the running process is an event-based scheduling policy in accordance with an illustrative embodiment, an execution context of the running process may be determined (step 308) to determine whether the running process is operating in user mode or kernel mode (step 310). If the running process is operating in the user mode, the process may be running arbitrary user code. In response to a determination at step 310 that the process is running in the user mode, a determination may be made whether the current run time for the process, that is, the duration of time that the process has been running, is less than a custom run time threshold value (step 312). The custom run time threshold value may be defined as an involuntary context switch limit for event-driven programs. In response to a determination at step 312 that the current run time for the process is less than the custom run time threshold value, the interrupt of the process may be ignored, the processor may be returned to running the process, and the process may thus be allowed to continue to run without any further scheduling action in the current scheduling interval (step 314).

In response to a determination at step 312 that the current run time for the process is not less than the custom run time threshold value, the process may be de-scheduled (step 316). For example, without limitation, step 316 may include removing the process from running on the processor and placing the removed process at the end of a wait queue. Step 316 may be performed to make sure that long running processor bound event-driven programs without I/O activities in them are harnessed without causing side-effects in the system such as processor starvation to other processes, deadlocks, hangs, or other undesirable conditions.

Returning to step 310, if the running process is in the kernel mode, the process is executing system calls. In response to a determination at step 310 that the running process is in the kernel mode, a specific system call made by the running process may be examined (step 318). A determination may be made whether a system call made by the running process is a non-blocking system call or an input/output operation system call (step 320). For example, without limitation, if the system call made by the running process is not a multi-event notification system call, a determination may be made at step 320 that the system call made by the processor is a non-blocking system call. Examples of multi-event notification system calls include, without limitation, epoll_wait in Linux, pollset_poll in AIX, and kevent in Darwin.

In response to a determination at step 320 that a system call made by the running process is a non-blocking system call, method 300 may continue with step 312. In this case, scheduling for the running process is handled in the same way as if the process were operating in the user mode. The process is allowed to continue running at step 314 if the run time for the process is determined to be less than the custom run time threshold value at step 312, with the process terminating thereafter. The running process is de-scheduled at step 316 if the run time for the process is determined not to be less than the custom run time threshold value at step 312, with the method terminating thereafter.

A system call made by the running process that is an input/output operation system call, such as a multi-event notification system call, means that the process wants to wait for an input/output operation, potentially for an arbitrary duration. In response to a determination at step 320 that the system call made by the running process is an input/output operation system call, method 300 may continue with step 316 in which the running process is de-scheduled, with the method terminating thereafter. This mechanism makes sure that the input/output wait time is aligned to the de-schedule time, thereby reducing the overall wait time.

When the running process enters a multi-event notification system call, there is a possibility that the event is ready at the moment for the running process and/or that the running process has not yet completed a valid share of time consumption that would normally be available. But de-scheduling the running process while the running process returns from this system call ensures that any extra time the running process has spent operating in the user mode (due to non-blocking activities) has been compensated by this de-schedule, and thereby fairness of CPU allocation is still preserved in the true multi-tasking execution environment while improving the CPU consumption and thereby overall throughput for workloads that exhibit non-blocking I/O characteristics hosted on event-driven virtual machines.

The basic premise of the illustrative embodiments is that an event-driven asynchronous virtual machine blocks only at one point, when all the I/O bound operations are registered with the operating system in a non-blocking manner and when all the CPU bound operations are completed. At that point, if any of the requested I/O is ready to be acted upon, the I/O is performed, otherwise the thread is blocked.

When an example client-server application hosted in node.js is executed in a Dual-CPU Intel® Xeon® (6.47), 2.27 GHz 64-bit Linux Server system, these data points were collected at the client side:

Total transactions: 3840
Total runtime: 11260 milliseconds
Total kernel time: 960 milliseconds
Total user time: 4530 milliseconds
Total number of context switches the process underwent: 625
Average de-schedule duration: 9.23 milliseconds
Average UV loop wait time: 9.46 milliseconds The observation from this data is that there exist two types of wait time for the running process: (i) the wait time while the process is in a de-scheduled state after being scheduled out at an arbitrary execution point, and (ii) the wait time while the process is waiting for an I/O event to occur after the event was registered with the operating system and the resources, as well as a peer end-point are being prepared for the I/O. Neither of these two types of wait time are in control of the running process Given that the running process can be de-scheduled at any arbitrary point in its execution sequence, a typical program will have undergone the two types of waits, as explained above. Mapping this information into the example data above, illustrates that the process would have suffered from I/O wait as well as CPU wait (de-schedule time) in a disjoint manner, duplicating the wait time—as the insight about where and when the application wait for the I/O is not known to the scheduler.

The inference from this observation is that if the context switches are aligned to the wait time in the UV loop, the total idle time of the process is reduced reasonably, with the reduction as a function of parity between the UV loop wait duration and the de-schedule duration, on a per I/O basis.

To illustrate this with an example, suppose:

The process runs for 100 milliseconds.

In which, the process waits for an I/O for 20 milliseconds.

And the process gets de-scheduled for 20 milliseconds.

In the most common scenario, the two wait times are disjoint. As a result, the process's actual CPU utilization (real runtime) is 60 milliseconds and 40 milliseconds are spent in waiting.

In accordance with the illustrative embodiments, de-scheduling of a running process is adjusted such that the de-scheduling is aligned with the I/O wait time. As a result, the process's actual CPU utilization (real runtime) is 80 milliseconds, as only 20 milliseconds are spent in waiting, with the two types of waiting coalesced into one. Therefore, under similar circumstances of running a transaction for 100 milliseconds, the proposed scenario implemented in accordance with an illustrative embodiment causes the running process to use more CPU time and thereby do more work.

Figure 4:
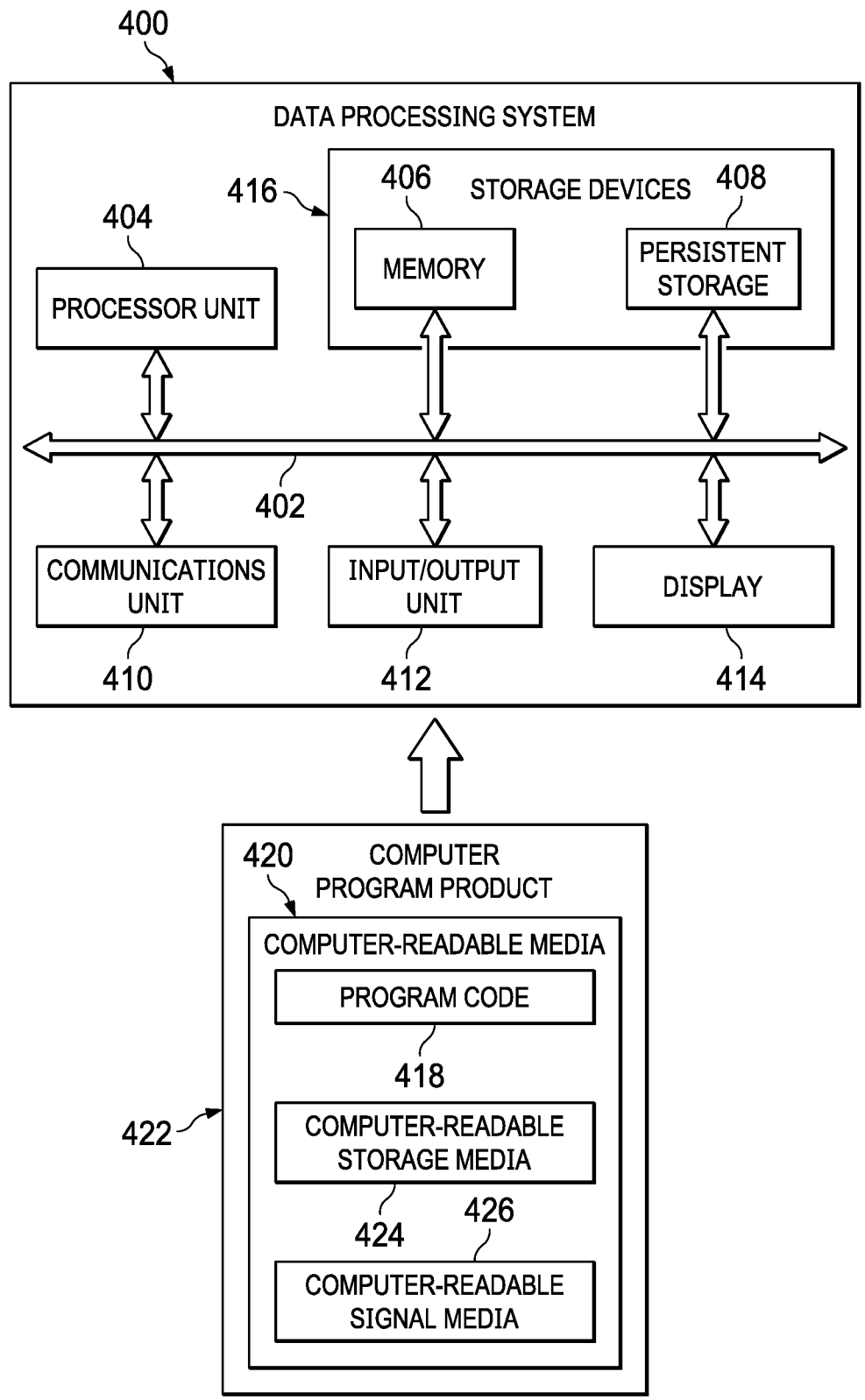
FIG. 4 is an illustration of a data processing system in accordance with an illustrative embodiment.

Turning to FIG. 4, a diagram of a data processing system is depicted in accordance with an illustrative embodiment. Data processing system 400 is an example of a computer, in which computer-readable program code or program instructions implementing processes of illustrative embodiments, such as scheduler 100 in FIG. 1, may be located. In this illustrative example, data processing system 400 includes communications fabric 402, which provides communications between processor unit 404, memory 406, persistent storage 408, communications unit 410, input/output unit 412, and display 414.

Processor unit 404 serves to execute instructions for software applications and programs that may be loaded into memory 406. Processor unit 404 may be a set of one or more hardware processor devices or may be a multi-processor core, depending on the particular implementation. Further, processor unit 404 may be implemented using one or more heterogeneous processor systems, in which a main processor is present with secondary processors on a single chip. As another illustrative example, processor unit 404 may be a symmetric multi-processor system containing multiple processors of the same type.

Memory 406 and persistent storage 408 are examples of storage devices 416. A computer-readable storage device is any piece of hardware that is capable of storing information, such as, without limitation, data, computer-readable program code in functional form, and/or other suitable information either on a transient basis or a persistent basis. Further, a computer-readable storage device excludes a propagation medium. Memory 406, in these examples, may be, for example, a random access memory, or any other suitable volatile or non-volatile storage device. Persistent storage 408 may take various forms, depending on the particular implementation. For example, persistent storage 408 may contain one or more devices. For example, persistent storage 408 may be a hard drive, a flash memory, a rewritable optical disk, a rewritable magnetic tape, or some combination of the above. The media used by persistent storage 408 may be removable. For example, a removable hard drive may be used for persistent storage 408.

Communications unit 410, in this example, provides for communication with other computers, data processing systems, and devices via network communications unit 410 may provide communications using both physical and wireless communications links. The physical communications link may utilize, for example, a wire, cable, universal serial bus, or any other physical technology to establish a physical communications link for data processing system 400. The wireless communications link may utilize, for example, shortwave, high frequency, ultra-high frequency, microwave, wireless fidelity (WiFi), Bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 400.

Input/output unit 412 allows for the input and output of data with other devices that may be connected to data processing system 400. For example, input/output unit 412 may provide a connection for user input through a keypad, keyboard, and/or some other suitable input device. Display 414 provides a mechanism to display information to a user and may include touch screen capabilities to allow the user to make on-screen selections through user interfaces or input data, for example.

Instructions for the operating system, applications, and/or programs may be located in storage devices 416, which are in communication with processor unit 404 through communications fabric 402. In this illustrative example, the instructions are in a functional form on persistent storage 408. These instructions may be loaded into memory 406 for running by processor unit 404. The processes of the different embodiments may be performed by processor unit 404 using computer-implemented program instructions, which may be located in a memory, such as memory 406. These program instructions are referred to as program code, computer-usable program code, or computer-readable program code that may be read and run by a processor in processor unit 404. The program code, in the different embodiments, may be embodied on different physical computer-readable storage devices, such as memory 406 or persistent storage 408.

Program code 418 is located in a functional form on computer-readable media 420 that is selectively removable and may be loaded onto or transferred to data processing system 400 for running by processor unit 404. Program code 418 and computer-readable media 420 form computer program product 422. In one example, computer-readable media 420 may be computer-readable storage media 424 or computer-readable signal media 426. Computer-readable storage media 424 may include, for example, an optical or magnetic disc that is inserted or placed into a drive or other device that is part of persistent storage 408 for transfer onto a storage device, such as a hard drive, that is part of persistent storage 408. Computer-readable storage media 424 also may take the form of a persistent storage, such as a hard drive, a thumb drive, or a flash memory that is connected to data processing system 400. In some instances, computer-readable storage media 424 may not be removable from data processing system 400.

Alternatively, program code 418 may be transferred to data processing system 400 using computer-readable signal media 426. Computer-readable signal media 426 may be, for example, a propagated data signal containing program code 418. For example, computer-readable signal media 426 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer-readable media also may take the form of nontangible media, such as communication links or wireless transmissions containing the program code.

In some illustrative embodiments, program code 418 may be downloaded over a network to persistent storage 408 from another device or data processing system through computer-readable signal media 426 for use within data processing system 400. For instance, program code stored in a computer-readable storage media in a data processing system may be downloaded over a network from the data processing system to data processing system 400. The data processing system providing program code 418 may be a server computer, a client computer, or some other device capable of storing and transmitting program code 418.

The different components illustrated for data processing system 400 are not meant to provide architectural limitations to the manner in which different embodiments may be implemented. The different illustrative embodiments may be implemented in a data processing system including components in addition to, or in place of, those illustrated for data processing system 400. Other components shown in FIG. 4 can be varied from the illustrative examples shown. The different embodiments may be implemented using any hardware device or system capable of executing program code. As one example, data processing system 400 may include organic components integrated with inorganic components and/or may be comprised entirely of organic components excluding a human being. For example, a storage device may be comprised of an organic semiconductor.

As another example, a computer-readable storage device in data processing system 400 is any hardware apparatus that may store data. Memory 406, persistent storage 408, and computer-readable storage media 424 are examples of physical storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406 or a cache such as found in an interface and memory controller hub that may be present in communications fabric 402.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of scheduling a process to run on a processor, comprising:
    determining whether a process running on a processor is making an input/output operation system call;
    de-scheduling the process from running on the processor in response to a determination that the process is making an input/output operation system call;
    allowing the process to continue running on the processor in response to a determination that the process is not making an input/output system call;
    determining whether operation of the processor has reached a ready phase, wherein the ready phase is a program control point in the operation of the processor where the processor has completed initialization sequences and is ready to execute processes; and
    selecting an event-based scheduling policy in lieu of a default scheduling policy as a selected scheduling policy for the process in response to a determination that the operation of the processor has reached the ready phase, wherein the event-based scheduling policy is selected for the process by invoking a system call to change a scheduling policy of the process, and wherein the event-based scheduling policy uses a custom run time threshold value and the default scheduling policy uses a default run time threshold value.

2. The computer-implemented method of claim 1 further comprising:
    determining whether a selected scheduling policy for the process running on the processor is the event-based scheduling policy; and
    determining whether the process running on the processor is making the input/output system call in response to a determination that the selected scheduling policy for the process running on the processor is the event-based scheduling policy.

3. The computer-implemented method of claim 1 further comprising:
    determining whether the process running on the processor is in a user mode or a kernel mode in which the process is making system calls; and
    determining whether the process running on the processor is making an input/output operation system call in response to a determination that the process running on the processor is in a kernel mode.

4. The computer-implemented method of claim 3 further comprising, in response to a determination that the process running on the processor is in a user mode:
    determining whether a run time for the process running on the processor is greater than the custom run time threshold value;
    de-scheduling the process from running on the processor in response to a determination that the run time for the process running on the processor is greater than the custom run time threshold value; and
    allowing the process to continue running on the processor in response to a determination that the run time for the process running on the processor is not greater than the custom run time threshold value.

5. The computer-implemented method of claim 3 further comprising, in response to a determination that the process running on the processor is in the kernel mode:
    determining whether the process running on the processor is making a non-blocking system call or the input/output operation system call.

6. The computer-implemented method of claim 5 further comprising, in response to a determination that the process running on the processor is making a non-blocking system call:
    determining whether a run time for the process running on the processor is greater than the custom run time threshold value;
    de-scheduling the process from running on the processor in response to a determination that the run time for the process running on the processor is greater than the custom run time threshold value; and allowing the process to continue running on the processor in response to a determination that the run time for the process running on the processor is not greater than the custom run time threshold value.

7. The computer-implemented method of claim 1, wherein selecting the event-based scheduling policy in lieu of the default scheduling policy comprises:

determining whether an event-driven process workload is to be processed in response to the determination that the operation of the processor has reached the ready phase.

8. The computer-implemented method of claim 7, wherein the ready phase is the program control point in the operation of the processor where the processor has completed the initialization sequences and is ready to execute the processes of an application, but an entry point routine of the application is not yet been invoked by the processor.

9. The computer-implemented method of claim 1, wherein the ready phase is the program control point in the operation of the processor where the processor has completed the initialization sequences and is ready to execute the processes of an application, but an entry point routine of the application is not yet invoked been by the processor, and wherein selecting the event-based scheduling policy in lieu of the default scheduling policy comprises:

determining whether an event-driven process workload is to be processed in response to the determination that the operation of the processor has reached the ready phase.

10. An apparatus, comprising a scheduler configured to:

determine whether a process running on a processor is making an input/output operation system call;

de-schedule the process from running on the processor in response to a determination that the process is making an input/output operation system call;

allow the process to continue running on the processor in response to a determination that the process is not making an input/output system call;

determine whether operation of the processor has reached a ready phase, wherein the ready phase is a program control point in the operation of the processor where the processor has completed initialization sequences and is ready to execute processes; and select an event-based scheduling policy in lieu of a default scheduling policy as a selected scheduling policy for the process in response to a determination that the operation of the processor has reached the ready phase, wherein the event-based scheduling policy is selected for the process by invoking a system call to change a scheduling policy of the process, and wherein the event-based scheduling policy uses a custom run time threshold value and the default scheduling policy uses a default run time threshold value.

11. The apparatus of claim 10, wherein the scheduler is further configured to:

determine whether a selected scheduling policy for the process running on the processor is the event-based scheduling policy; and determine whether the process running on the processor is making the input/output system call in response to a determination that the selected scheduling policy for the process running on the processor is the event-based scheduling policy.

12. The apparatus of claim 10, wherein the scheduler is further configured to:

determine whether the process running on the processor is in a user mode or a kernel mode in which the process is making system calls; and determine whether the process running on the processor is making an input/output operation system call in response to a determination that the process running on the processor is in a kernel mode.

13. The apparatus of claim 12, wherein the scheduler is further configured to, in response to a determination that the process running on the processor is in a user mode:

determine whether a run time for the process running on the processor is greater than the custom run time threshold value;

de-schedule the process from running on the processor in response to a determination that the run time for the process running on the processor is greater than the custom run time threshold value; and allow the process to continue running on the processor in response to a determination that the run time for the process running on the processor is not greater than the custom run time threshold value.

14. The apparatus of claim 12, wherein the scheduler is further configured to, in response to a determination that the process running on the processor is in the kernel mode:

determine whether the process running on the processor is making a non-blocking system call or the input/output operation system call.

15. The apparatus of claim 14, wherein the scheduler is further configured to, in response to a determination that the process running on the processor is making a non-blocking system call:

determine whether a run time for the process running on the processor is greater than the custom run time threshold value;

de-schedule the process from running on the processor in response to a determination that the run time for the process running on the processor is greater than the custom run time threshold value; and allow the process to continue running on the processor in response to a determination that the run time for the process running on the processor is not greater than the custom run time threshold value.

16. A computer program product for scheduling a process to run on a processor, comprising:

a computer readable storage medium having stored thereon:

first program instructions executable by a device to cause the device to determine whether a process running on a processor is making an input/output operation system call;

second program instructions executable by the device to cause the device to de-schedule the process from running on the processor in response to a determination that the process is making an input/output operation system call and to allow the process to continue running on the processor in response to a determination that the process is not making an input/output system call;

third program instructions stored on the computer readable storage medium and executable by the device to cause the device to determine whether operation of the processor has reached a ready phase, wherein the ready phase is a program control point in the operation of the processor where the processor has completed initialization sequences and is ready to execute processes; and fourth program instructions stored on the computer readable storage medium and executable by the device to cause the device to select an event-based scheduling policy in lieu of a default scheduling policy as a selected scheduling policy for the process in response to a determination that the operation of the processor has reached the ready phase, wherein the event-based scheduling policy is selected for the process by invoking a system call to change a scheduling policy of the process, and wherein the event-based scheduling policy uses a custom run time threshold value and the default scheduling policy uses a default run time threshold value.

17. The computer program product of claim 16, further comprising:
fifth program instructions stored on the computer readable storage medium and executable by the device to cause the device to determine whether a selected scheduling policy for the process running on the processor is the event-based scheduling policy; and
wherein the second program instructions are executable by the device to cause the device to determine whether the process running on the processor is making the input/output system call in response to a determination that the selected scheduling policy for the process running on the processor is the event-based scheduling policy.

18. The computer program product of claim 16, further comprising:
fifth program instructions stored on the computer readable storage medium and executable by the device to cause the device to determine whether the process running on the processor is in a user mode or a kernel mode in which the process is making system calls; and
wherein the second program instructions are executable by the device to cause the device to determine whether the process running on the processor is making an input/output system call in response to a determination that the process running on the processor is in a kernel mode.

19. The computer program product of claim 18 further comprising:
sixth program instructions stored on the computer readable storage medium and executable by the device to cause the device to, in response to a determination that the process running on the processor is in a user mode, determine whether a run time for the process running on the processor is greater than the custom run time threshold value, de-schedule the process from running on the processor in response to a determination that the run time for the process running on the processor is greater than the custom run time threshold value, and allow the process to continue running on the processor in response to a determination that the run time for the process running on the processor is not greater than the custom run time threshold value.

20. The computer program product of claim 18 further comprising:
sixth program instructions stored on the computer readable storage medium and executable by the device to cause the device to, in response to a determination that the process running on the processor is in the kernel mode, determine whether the process running on the processor is making a non-blocking system call or the input/output operation system call; in response to a determination that the process running on the processor is making a non-blocking system call, determine whether the run time for the process running on the processor is greater than the custom run time threshold value, de-schedule the process from running on the processor in response to a determination that the run time for the process running on the processor is greater than the custom run time threshold value; and allow the process to continue running on the processor in response to a determination that the run time for the process running on the processor is not greater than the custom run time threshold value.

* * * * *